United States Patent
Kautzsch et al.

(10) Patent No.: US 10,539,587 B2
(45) Date of Patent: Jan. 21, 2020

(54) ACCELEROMETER WITH COMPATIBILITY TO COMPLEMENTARY METAL-OXIDE-SEMICONDUCTOR TECHNOLOGIES

(71) Applicant: Infineon Technologies Dresden GmbH, Dresden (DE)

(72) Inventors: Thoralf Kautzsch, Dresden (DE); Steffen Bieselt, Stadt Wehlen (DE)

(73) Assignee: Infineon Technologies Dresden GmbH, Dresden (DE)

( * ) Notice: Subject to any disclaimer, the term of this patent is extended or adjusted under 35 U.S.C. 154(b) by 344 days.

(21) Appl. No.: 15/422,138

(22) Filed: Feb. 1, 2017

(65) Prior Publication Data
US 2018/0217178 A1    Aug. 2, 2018

(51) Int. Cl.
*G01P 15/02* (2013.01)
*G01P 15/08* (2006.01)

(52) U.S. Cl.
CPC .................. *G01P 15/0802* (2013.01)

(58) Field of Classification Search
None
See application file for complete search history.

(56) References Cited

U.S. PATENT DOCUMENTS

| | | |
|---|---|---|
| 8,481,400 B2 | 7/2013 | Kautzsch et al. |
| 8,994,127 B2 | 3/2015 | Kautzsch et al. |
| 9,382,111 B2 | 7/2016 | Kautzsch et al. |
| 2014/0183753 A1* | 7/2014 | Ellis-Monaghan ..... H01L 21/84 257/774 |
| 2016/0107879 A1* | 4/2016 | Kautzsch ............ G01P 15/125 257/418 |

OTHER PUBLICATIONS

Altena et al. "Design Modeling Fabrication and Characterization of an electret based MEMS electrostatic energy harvestor" Transducers'11 Beijing China Jun. 5-9, 2011 IEEE (Year: 2011).*

* cited by examiner

*Primary Examiner* — Bradley Smith
(74) *Attorney, Agent, or Firm* — Harrity & Harrity, LLP

(57) ABSTRACT

An accelerometer may include a seismic mass to flex based on acceleration components perpendicular to a surface of a substrate. The seismic mass may include a first electrode and a portion of the substrate. A first surface of the seismic mass may be adjacent to a first cavity in the substrate, and a second surface of the seismic mass being adjacent to a second cavity. The first surface of the seismic mass and the second surface of the seismic mass may be on opposite sides of the seismic mass. The accelerometer may include a second electrode separated from the second surface of the seismic mass by at least the second cavity.

20 Claims, 12 Drawing Sheets

ACCELEROMETER WITH COMPATIBILITY TO COMPLEMENTARY METAL-OXIDE-SEMICONDUCTOR TECHNOLOGIES

BACKGROUND

A typical acceleration sensing device (i.e., an accelerometer) is formed using a sequence of steps, such as depositing, structuring, etching, removing, etc., various semiconductor and non-semiconductor layers in order to form one or more flexible elements that provide functionality of the accelerometer.

SUMMARY

According to some possible implementations, an accelerometer may include: a seismic mass to flex based on acceleration components perpendicular to a surface of a substrate, where the seismic mass may include a first electrode and a portion of the substrate, where a first surface of the seismic mass may be adjacent to a first cavity in the substrate, and where a second surface of the seismic mass may be adjacent to a second cavity, where the first surface of the seismic mass and the second surface of the seismic mass may be on opposite sides of the seismic mass; and a second electrode separated from the second surface of the seismic mass by at least the second cavity.

According to some possible implementations, a semiconductor device may include: a substrate including a first cavity; a seismic mass formed of a portion of the substrate and a first electrode, where a first surface of the seismic mass may be adjacent to the first cavity, and a second surface of the seismic mass may be adjacent to a second cavity, where the first electrode may be located at the second surface of the seismic mass, and where the first surface of the seismic mass and the second surface of the seismic mass may be on opposite sides of the seismic mass; an oxide layer that defines the second cavity; and a second electrode separated from the second surface of the seismic mass by a portion of the oxide layer and the second cavity.

According to some possible implementations, a method for manufacturing a semiconductor device may include: obtaining a substrate including a first cavity below a surface of the substrate; forming a first oxide layer on the surface of the substrate; forming a first electrode layer on the first oxide layer to form a first electrode; etching one or more trenches in the first electrode layer, the first oxide layer, and a portion of the substrate to form a seismic mass that includes the first electrode and the portion of the substrate, where the portion of the substrate may be a portion of the substrate located between the first cavity and the surface of the substrate; forming a sacrificial layer on at least the seismic mass; forming a second oxide layer on the sacrificial layer; forming a second electrode layer on the second oxide layer to form a second electrode; and removing the sacrificial layer to form a second cavity, where the second electrode may be separated from the seismic mass by a portion of the second oxide layer and the second cavity.

DETAILED DESCRIPTION

Figure 1:
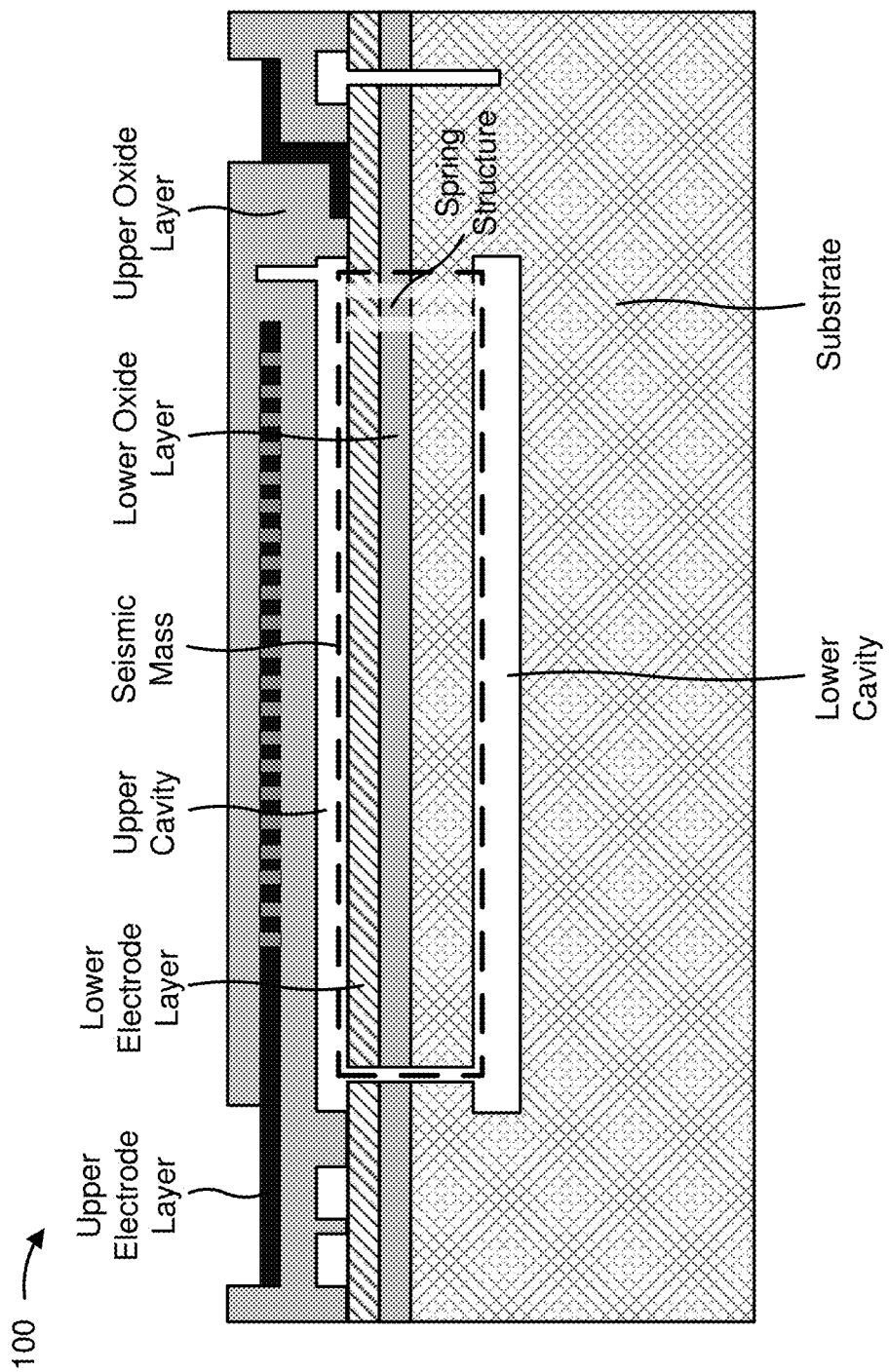
FIG. 1 is a diagram of a cross-section of an example accelerometer with compatibility to complementary metal-oxide-semiconductor (CMOS) technologies, as described herein.

The following detailed description of example implementations refers to the accompanying drawings. The same reference numbers in different drawings may identify the same or similar elements.

An accelerometer can be formed using a surface micromachining technique. For example, the accelerometer may be formed using a sequence of process steps that form one or more flexible elements, where the one or more flexible elements may provide functionality of the accelerometer. Such process steps may include, for example, forming a substrate, depositing and structuring a sacrificial layer on the substrate, depositing and structuring a semiconductor layer on the sacrificial layer, and etching and/or removing the sacrificial layer in order to form the one or more flexible elements, where the one or more flexible elements may include one or more portions of the semiconductor layer. Here, the substrate acts as a supportive element and does not provide functionality associated with operation of the accelerometer.

Due to the nature of such processes (e.g., an arrangement of layers, thicknesses of layers, or the like) and/or a size of the semiconductor device, integration of the accelerometer with CMOS circuitry (e.g., a semiconductor device used for peripheral electronics, such as an application specific integrated circuit (ASIC)) may be difficult and/or impossible. However, an application that allows for reduced sensitivity of the accelerometer (e.g., as compared to a highly sensitive application for movement and/or position detection) while demanding a low amount of area consumption, such as a tire pressure monitoring system (TPMS), may be suitable for integration of an accelerometer with CMOS circuitry. In such a case, an accelerometer with a relatively small amount of area consumption and relatively few additional steps (in addition to standard CMOS processing steps) would allow for a cost-efficient and/or effective integration of forming the accelerometer with a typical CMOS processing sequence.

Implementations described herein provide an accelerometer with improved compatibility to CMOS processing techniques. In some implementations, the formation of the accelerometer may be integrated with a standard CMOS processing sequence (e.g., such that the accelerometer may be formed side-by-side with ASIC circuitry with relatively few additional process steps).

In some implementations, the accelerometer includes a flexible element (herein referred to as a seismic mass) that is formed from a portion of a substrate. In other words, in some implementations, a portion of the substrate may contribute to the functionality of the accelerometer. In some implementations, the seismic mass may be formed using a cavity included in the substrate, where the cavity is formed using a silicon-on-nothing (SON) process (sometimes referred to as a Venezia process). In such a case, the seismic mass may include silicon particles that have migrated as a result of the SON process (i.e., the seismic mass may include migrated substrate particles). Additional details regarding such an accelerometer are described below.

FIG. 1 is a diagram of a cross-section of an example accelerometer 100 with compatibility to CMOS technologies, as described herein. FIG. 1 provides an overview of an example arrangement of layers and cavities of accelerometer 100. Additional details regarding formation of accelerometer 100 are provided below with regard to FIGS. 2A-2J and FIG. 3.

As shown in FIG. 1, accelerometer 100 may include a substrate including a lower (first) cavity that is a space that is free of material. In some implementations, the lower cavity is formed within the substrate using a SON process.

As further shown, accelerometer 100 may include a seismic mass (i.e., a flexible element). As shown, the seismic mass may include a portion of the substrate that is between a surface of the substrate and the lower cavity (e.g., shown as a portion above the lower cavity and below an upper (second) cavity in FIG. 1). As shown, the seismic mass may include a spring structure that connects the seismic mass to a non-flexible portion of accelerometer 100 and that allows the seismic mass to flex up (e.g., and down in a vertical direction with respect to FIG. 1) based on acceleration components that are perpendicular to a surface of the substrate (e.g., a horizontal surface with respect to FIG. 1). As shown, accelerometer 100 may integrate the seismic mass with the substrate of accelerometer 100 (i.e., such that a portion of the seismic mass is formed from a portion of a substrate of accelerometer 100).

As further shown in FIG. 1, the seismic mass may further include a portion of a lower (first) oxide layer and a portion of a lower (first) electrode layer. In some implementations, the portion of the lower oxide layer isolates the portion of the lower electrode layer, while the lower electrode layer receives an electric potential that allows accelerometer 100 to operate based on a capacitive sensing technique, as described below. In some implementations, as shown in FIG. 1, the lower electrode layer may be formed by depositing a semiconductor material (e.g., polycrystalline silicon) on the lower oxide layer. Alternatively, the lower electrode layer may be fabricated by diffusing a counter-doping species into the substrate portion of the seismic mass (not shown).

In some implementations, the lower oxide layer and the lower electrode layer are formed on the substrate surface, and the seismic mass is formed by etching trenches in the lower electrode layer, the lower oxide layer, and the portion of the substrate between the substrate surface and the lower cavity. Additional details regarding forming the seismic mass are described below.

As further shown in FIG. 1, an upper (second) cavity may be formed to cover the seismic mass. In some implementations, the upper cavity may be formed by depositing a sacrificial layer (e.g., a carbon sacrificial layer) on a portion of the lower electrode layer over at least the seismic mass, depositing a portion of an upper (second) oxide layer on the sacrificial layer (and portions of the lower electrode layer not covered by the sacrificial layer), and removing the sacrificial layer (e.g., after depositing additional portions of the upper oxide layer and/or an upper (second) electrode layer over a portion of the upper oxide layer).

As further shown, the upper electrode layer may be formed to define the upper cavity such that the upper electrode layer is partially enclosed within the upper oxide layer. Here, accelerometer 100 may operate based on a capacitive sensing technique, where an electric potential may be applied to the lower electrode layer and the upper electrode layer, and capacitance may be measured. The capacitance is indicative of the acceleration components of accelerometer 100 (e.g., since the capacitance will vary as the seismic mass flexes and the distance between the lower and upper electrode layers varies).

In some cases, such a structure simplifies operation and/or use of accelerometer 100. For example, a defined electric potential is needed only at the lower electrode layer and at the upper electrode layer, meaning that no sideways readout or bottom readout is needed in order to operate accelerometer 100. Furthermore, accelerometer 100 may be formed using relatively few additional processing steps when integrating with a standard CMOS processing sequence.

The number, arrangement, width, thicknesses, order, symmetry, or the like, of layers shown in FIG. 1 are provided as an example. In practice, accelerometer 100 may include additional layers, fewer layers, different layers, differently constructed layers, or differently arranged layers than those shown in FIG. 1. Additionally, or alternatively, a set of layers (e.g., one or more layers) of accelerometer 100 may perform one or more functions described as being performed by another set of layers of accelerometer 100.

FIGS. 2A-2J are diagrams showing example cross-sections associated with forming example accelerometer 100, as described herein.

Figure 2A:
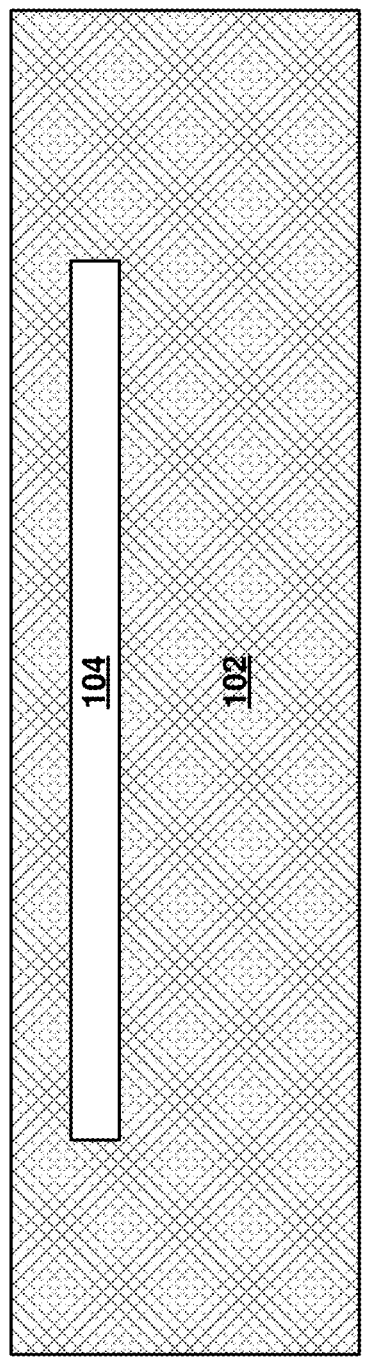
FIGS. 2A-2J are diagrams showing example views associated with process steps for forming the example accelerometer of FIG. 1.

FIG. 2A is a diagram of an example cross-section of substrate 102 including a cavity 104 below a surface (e.g., a top surface) of substrate 102. In some implementations, additional layers of accelerometer 100 may be formed on the surface of substrate 102, as described below. Substrate 102 includes a substrate layer that provides support for accelerometer 100. In some implementations, a portion of substrate 102 over cavity 104 may be included in a seismic mass associated with operating accelerometer 100. In some implementations, substrate 102 comprises a bulk semiconductor material such as bulk silicon (Si), bulk germanium (Ge), or the like. In some implementations, substrate 102 may have an overall thickness that ranges from approximately 710 µm to approximately 725 µm, or approximately 740 µm. As shown, substrate 102 may include cavity 104, where cavity 104 is a space within substrate 102 that is free of material. In some implementations, cavity 104 may have a height that ranges from approximately 0.5 µm to approximately 1.5 µm, such as a height of approximately 1 µm.

In a case where substrate 102 comprises bulk silicon, cavity 104 may be formed within substrate 102 using a SON process. For example, an opening may be formed by etching the surface of substrate 102 and applying a heat treatment to the etched substrate 102 in a hydrogen atmosphere. The application of the heat treatment in the hydrogen atmosphere causes a portion of substrate 102 (e.g., a portion of substrate 102 at a bottom of the opening and/or at a side of the opening) to migrate to form a continuous bulk layer at a top portion of the opening, thereby forming cavity 104. In other words, in some implementations, cavity 104 may be formed by causing a portion of substrate 102 to migrate from one or more regions of substrate 102 (e.g., the bottom of the opening, sides of the opening, or the like) to form another portion of substrate 102 (e.g., a portion of substrate 102 above cavity 104, as shown in FIG. 2A). Such a migration process may be a process in which the removed material is recrystallized after migration by a self-organization. In some implementations, the portion of substrate 102 between the substrate surface and cavity 104 (e.g., the portion of substrate 102 above cavity 104 as shown in FIG. 2A) may have a thickness that ranges from approximately 1.5 µm to approximately 7 µm, or approximately 5 µm.

Figure 2B:
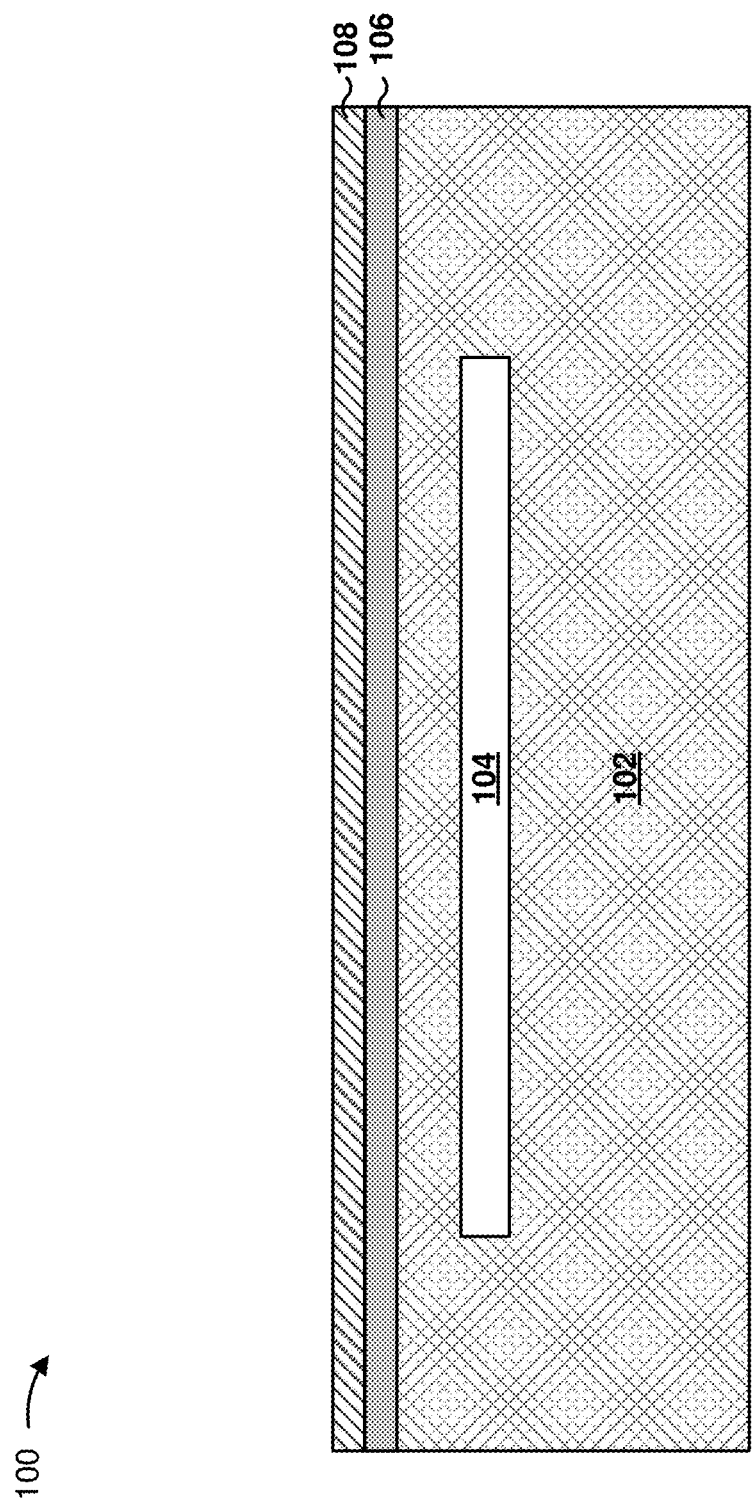

FIG. 2B is a diagram showing an example cross section associated with forming oxide layer 106 and electrode layer 108 on the surface of substrate 102. As shown in FIG. 2B, oxide layer 106 may be formed on the surface of substrate 102 (e.g., including the portion of substrate 102 above cavity 104 as shown in FIG. 2B). In some implementations, oxide layer 106 may include a dielectric material, such as silicon oxide, that is deposited on the surface of substrate 102. In some implementations, oxide layer 106 may have a thickness that ranges from approximately 50 nm to approximately 500 nm or approximately 300 nm.

As further shown, electrode layer 108 may be formed on oxide layer 106. In some implementations, a portion of electrode layer 108 may act as a first (lower) electrode for implementing a capacitive sensing technique associated with operation of accelerometer 100. In some implementations, electrode layer 108 may be formed from a polycrystalline material, such as polycrystalline silicon, that is deposited on oxide layer 106. In some implementations, electrode layer 108 may have a thickness that ranges from approximately 50 nm to approximately 150 nm or approximately 100 nm. Alternatively, the first electrode of accelerometer 100 may be fabricated by diffusing a counter-doping species into a portion of substrate 102 between the substrate surface and cavity 104 (not shown).

Figure 2C:
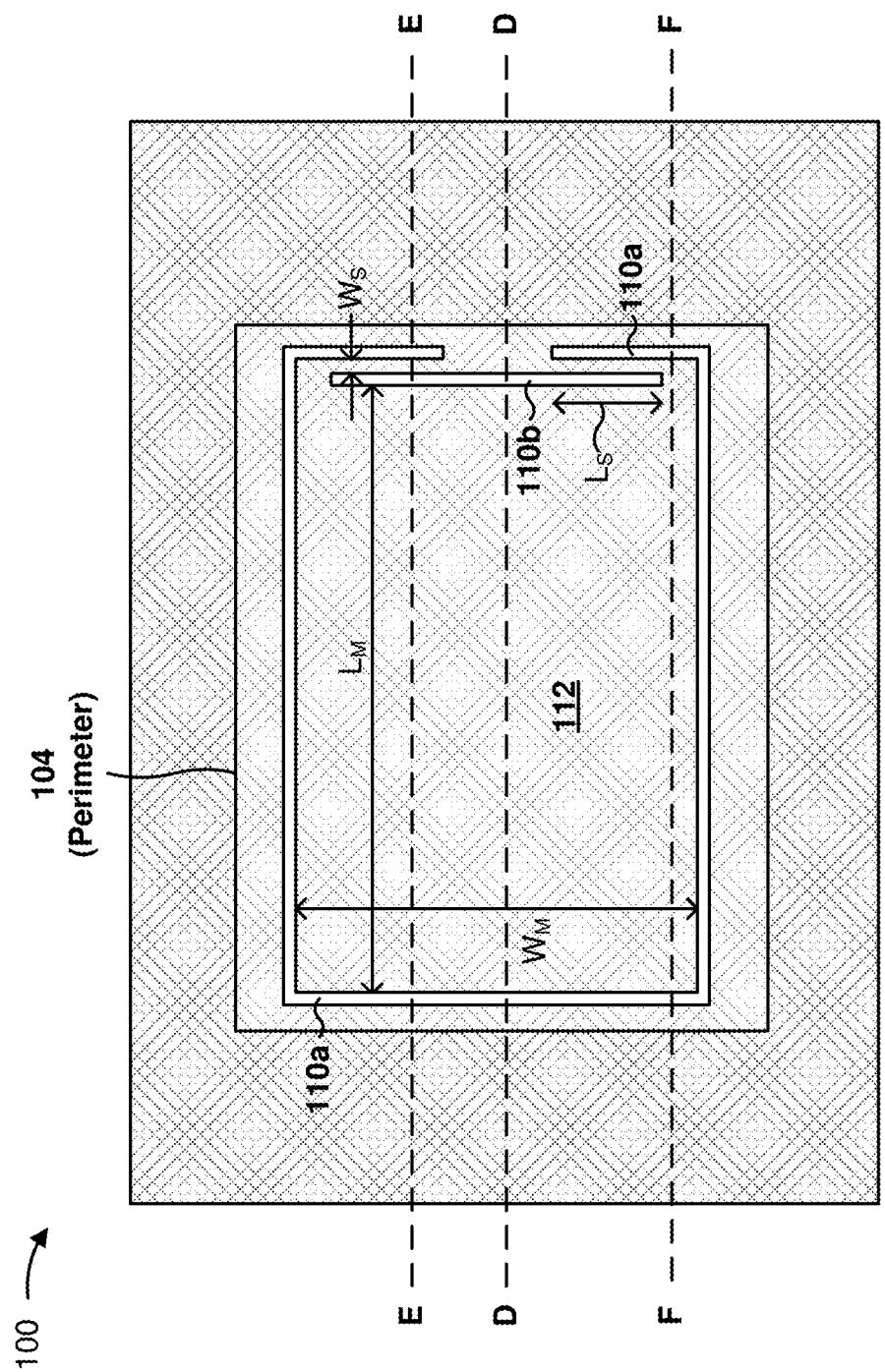
Figure 2D:
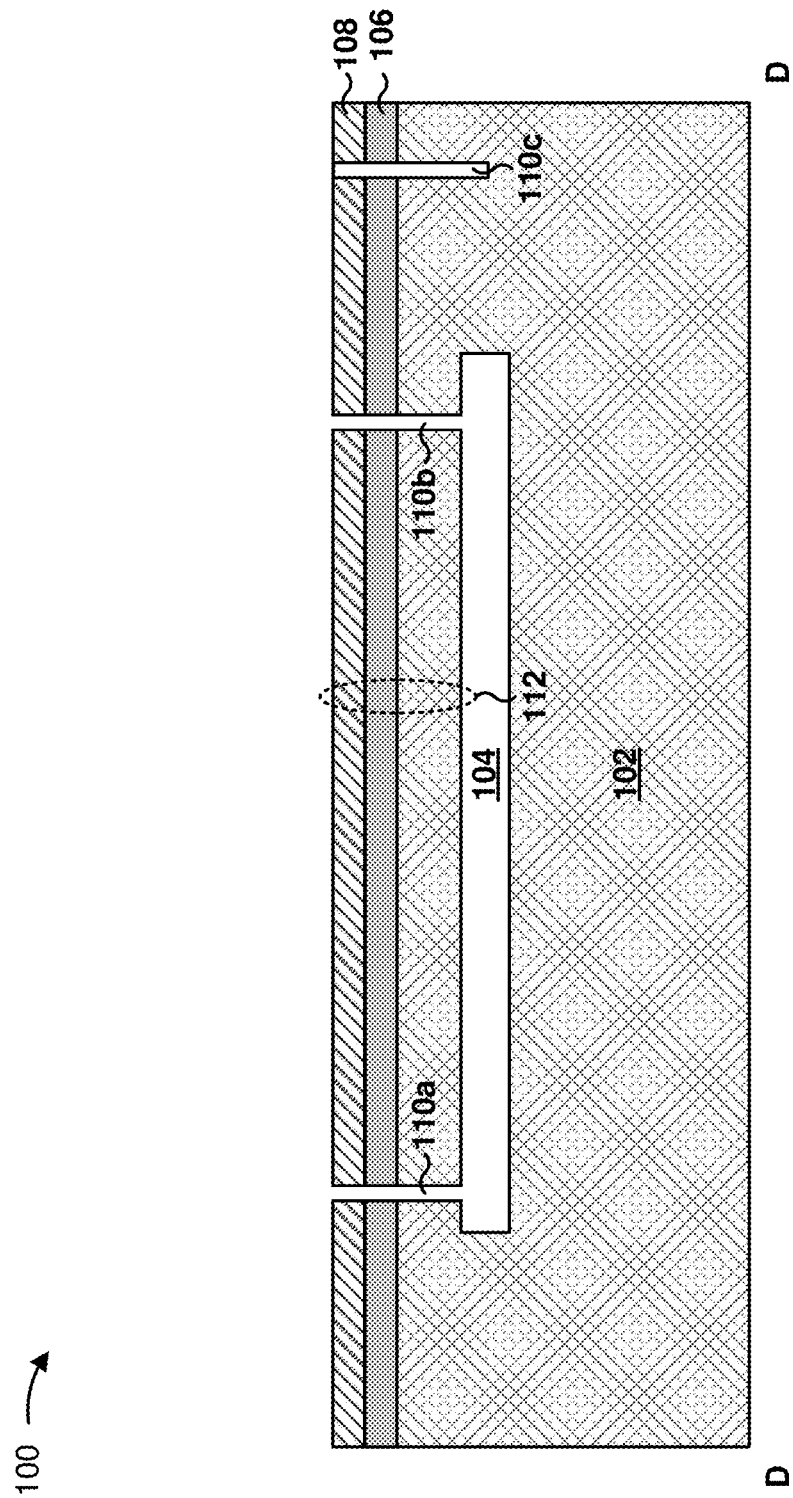
Figure 2E:
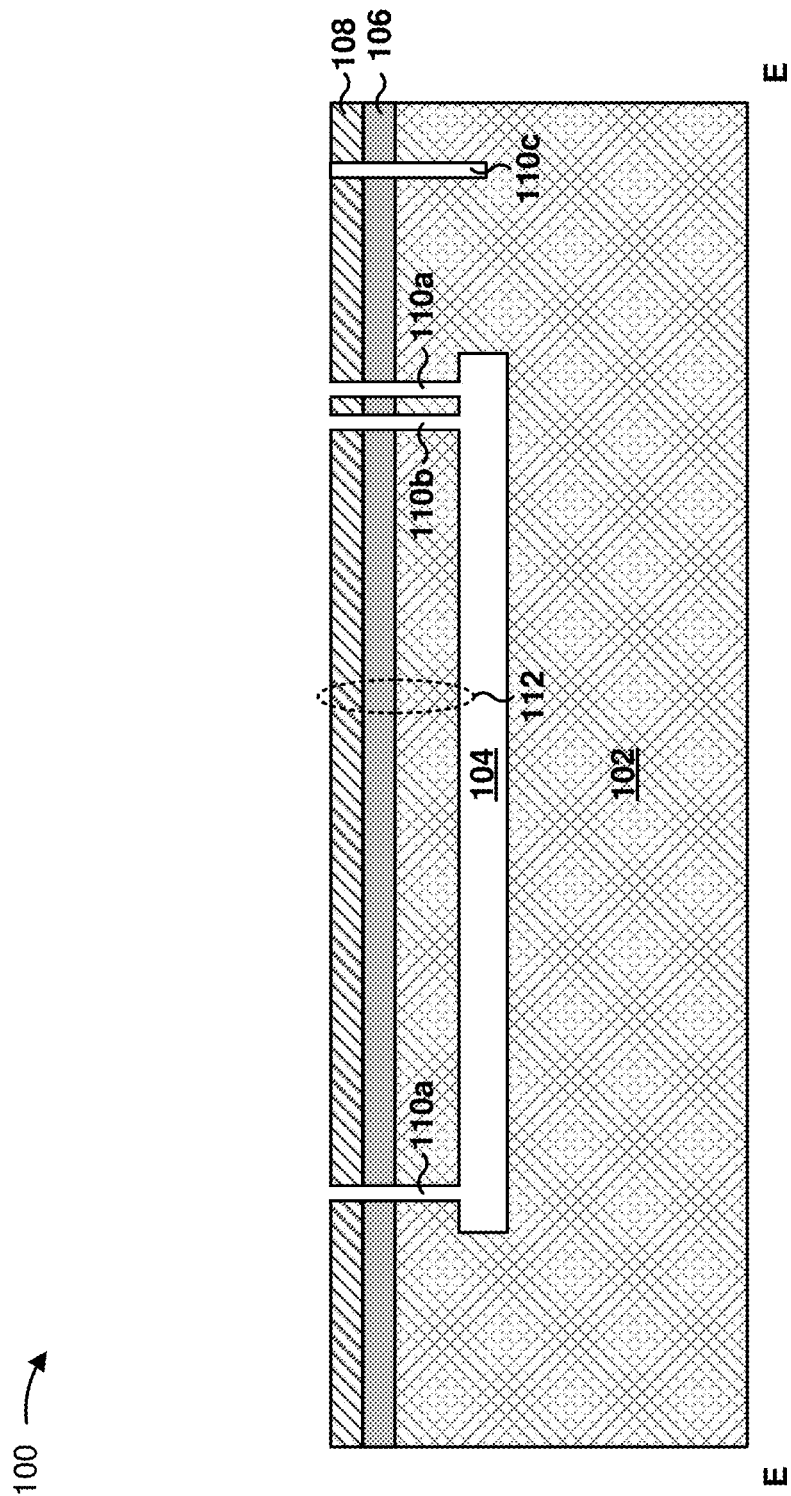
Figure 2F:
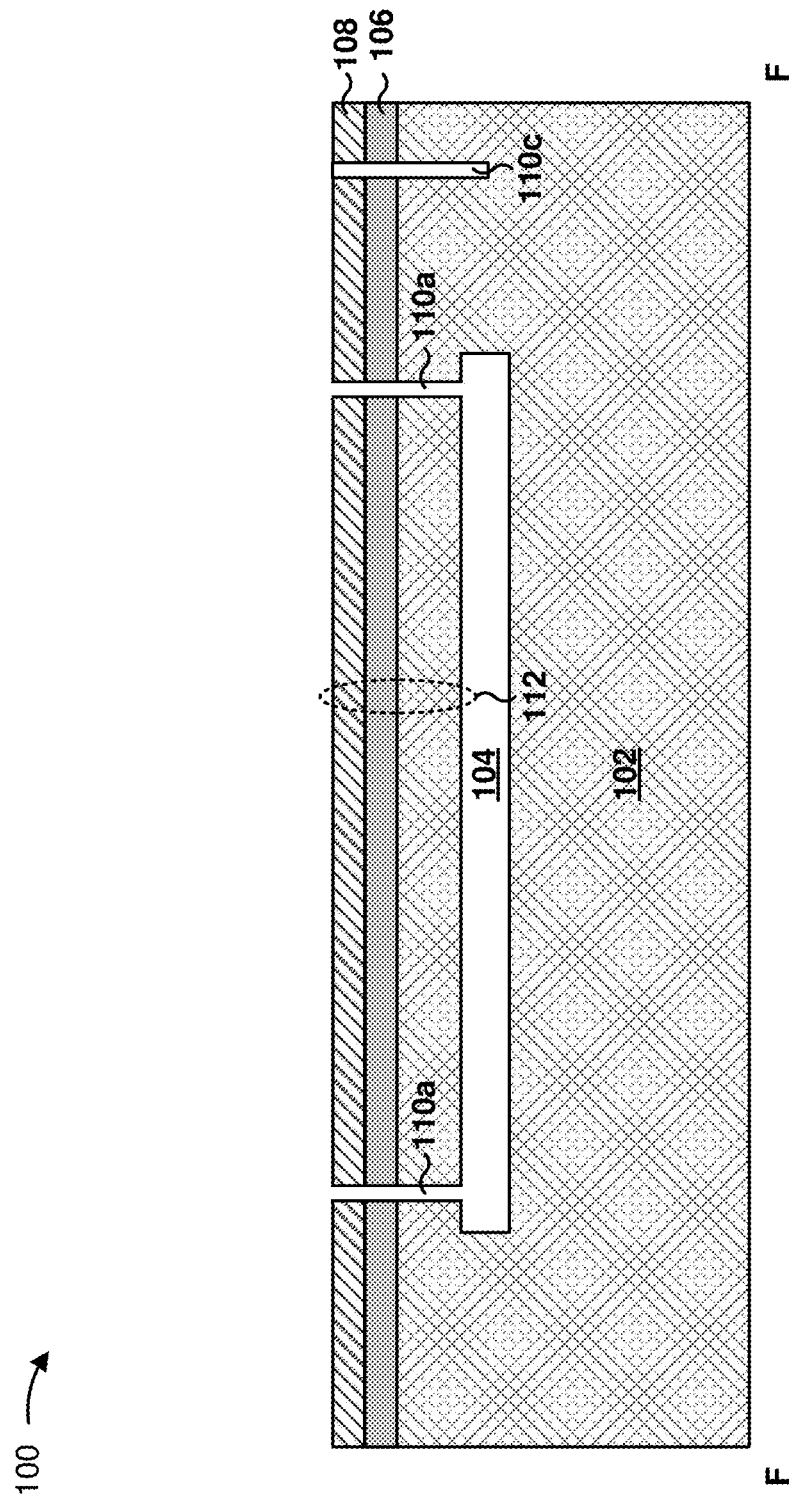

FIGS. 2C-2F are diagrams showing an example arrangement of trenches 110 associated with forming seismic mass 112 of accelerometer 100. FIG. 2C is a diagram of an example top view (e.g., the top surface) of accelerometer 100 including trenches 110a and 110b. FIGS. 2D-2F are diagrams of example cross-sections as labeled in FIG. 2C.

As shown in FIG. 2C, trench 110a and trench 110b may be formed (e.g., etched) in order to form seismic mass 112 over cavity 104. Here, trench 110a and trench 110b may be etched through electrode layer 108, oxide layer 106, and substrate 102 over cavity 104 in order to form seismic mass 112. In some implementations, trench 110a and trench 110b may have a width that ranges from approximately 80 nm to approximately 200 nm, or approximately 150 nm.

As shown, trench 110a and trench 110b may form a spring structure at one side of seismic mass (e.g., FIG. 2C shows the spring structure at the right side of seismic mass 112). As shown, in some implementations, the spring structure may include two springs, each with a spring length and spring width (labeled Ls and Ws in FIG. 2C, respectively). In some implementations, trenches 110 of accelerometer 100 may be etched such that the spring structure of accelerometer 100 has a different number of springs (e.g., one, three, six, or the like) and/or differently arranged springs than shown in FIG. 2C. In some implementations, springs of the spring structure may have matching spring widths and/or spring lengths or different spring widths and/or spring lengths.

In some implementations, trenches 110a and 110b may be etched such that seismic mass 112 has a mass length (e.g., labeled as $L_M$ in FIG. 2C) that ranges from approximately 30 µm to approximately 100 µm, or approximately 60 µm. In some implementations, trenches 110a and 110b may be etched such that seismic mass 112 has a mass width (e.g., labeled as $W_m$ in FIG. 2C) that ranges from approximately 20 µm to approximately 30 µm, or approximately 25 µm. In some implementations, trench etching for formation of seismic mass 112 may be performed in a single etching sequence.

FIGS. 2D, 2E, and 2F show example cross sections of accelerometer 100 at the dashed lines labeled "D-D," "E-E," and "F-F" in FIG. 2C, respectively. Notably, as shown in FIGS. 2D-2F, seismic mass 112 includes a portion of substrate 102 over cavity 104. In other words, seismic mass 112 includes migrated silicon particles of substrate 102. As further shown in FIGS. 2D-2F, in some implementations, trench 110c may be formed (e.g., in a manner similar to that of trenches 110a and 110b). In some implementations, trench 110c may act to electrically isolate the portion of electrode layer 108 included in seismic mass 112 and the portion of electrode layer 108 via which an electric potential is applied (e.g., to the portion of electrode layer 108 included in seismic mass 112).

In some implementations, use of such a spring structure for accelerometer 100 may provide scalability of accelerometer 100. For example, in order to achieve a given sensitivity, an overall size of accelerometer 100 depends on the spring width and the mass length of seismic mass 112. The sensitivity of accelerometer 100 depends on a tip displacement of seismic mass 112, which may be determined based on the following equation:

$$\Delta z = 2 \frac{g\rho}{G} \cdot \frac{W_M L_S L_M^3}{W_S^3}$$

where $\Delta z$ is the tip displacement of seismic mass 112, G is a material shear modulus (e.g., a shear modulus of silicon), $W_s$ is the width of the spring, g is the gravitational constant, $\rho$ is a material density (e.g., a density of silicon), $W_M$ is the width of seismic mass 112 the, $L_M$ is the length of seismic mass 112, and $L_S$ is the spring length of the spring. Notably, the tip displacement (and thus, sensitivity) is independent from a thickness of seismic mass 112, which may allow for a compact design (e.g., since a reduced thickness does not impact sensitivity of accelerometer 100).

As an example of determining sensitivity using the above equation, assume that $W_M$ is equal to 25 µm, $L_M$ is equal to 50 µm, $L_s$ is equal to 10 µm, and $W_s$ is equal to 0.5 µm. Here, $\Delta z$ is approximately equal to 0.07 nm when a double spring is used.

$$\Delta z = 5.7 \cdot 10^{-7} \cdot m^{-1} \cdot \frac{25 \cdot 10 \cdot 50^3}{0.5^3} \cdot 10^{-12} \cdot m^2$$

$$\Delta z = 1.425 \cdot 10^{-10} \ m \approx 0.14 \ \text{nm (per spring)}$$

$$\Delta z = \frac{0.14 \ \text{nm}}{2} = 0.07 \ \text{nm (when a using a double spring)}$$

A tip displacement of 0.07 nm results in a capacitance change of approximately 25 attoFarads (aF) when eight such structures are used in parallel. Assuming a resolution of approximately 1 aF, a full bridge with an area of 0.04 square millimeters results in a sensitivity of approximately 40 milligravities, which may be suitable for a given application, such as a TPMS application.

In some implementations, formation of accelerometer 100 from the deposition of oxide layer 106 through the formation of trenches 110 may be integrated with a CMOS processing sequence, since a typical CMOS processing sequence includes deposition and etching steps similar to those associated with FIGS. 2B-2F. In other words, formation of accelerometer 100 from the deposition of oxide layer 106 through the formation of trenches 110 may provide improved compatibility to a CMOS processing sequence (e.g., as compared to an accelerometer formed using a surface micromachining technique).

Figure 2G:
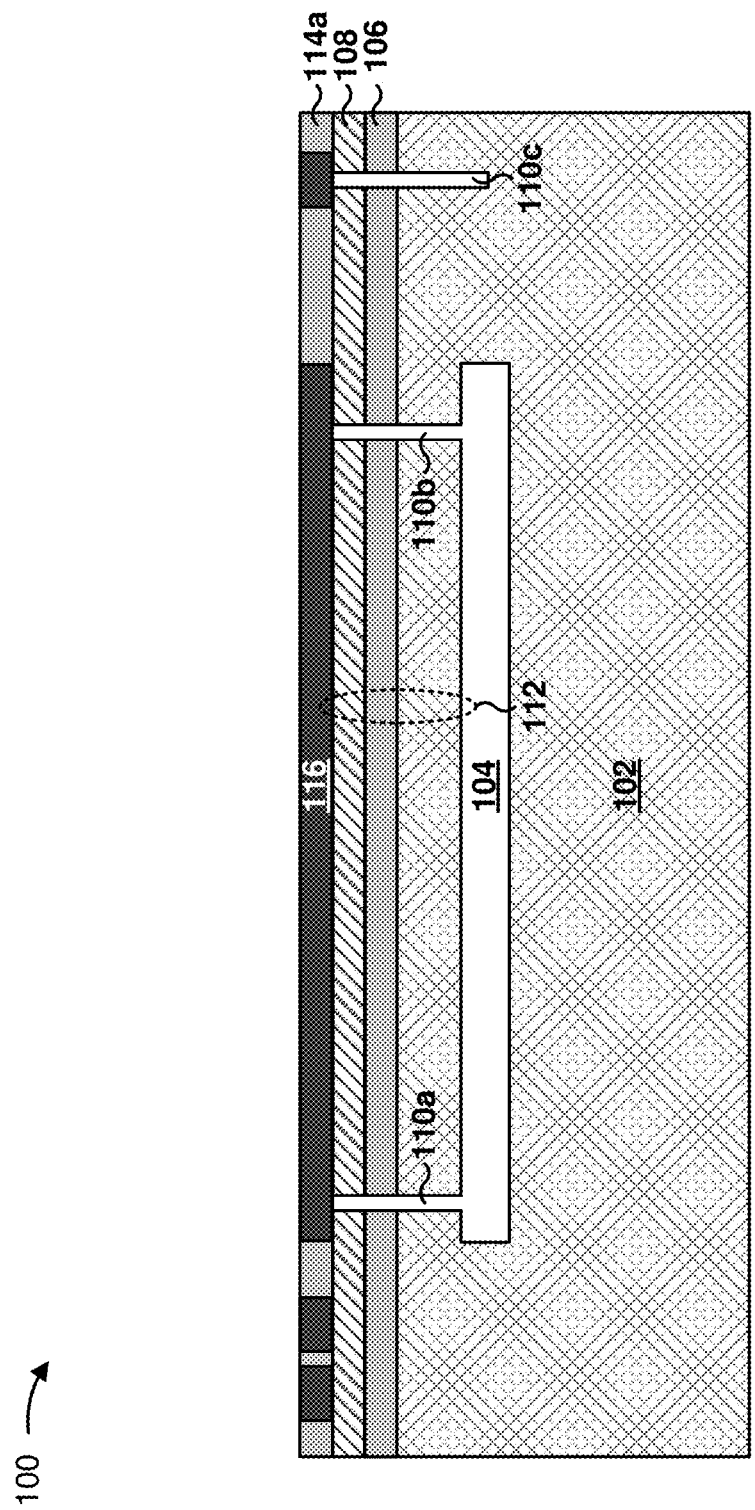

FIG. 2G is a diagram showing an example cross section associated with forming oxide layer 114a and sacrificial layer 116 on electrode layer 108. As shown in FIG. 2G, sacrificial layer 116 may be formed on at least a portion of electrode layer 108 included in seismic mass 112. Notably, while the cross section of FIG. 2G shows sacrificial layer 116 as including unconnected portions, sacrificial layer 116 may be formed as a single connected layer (i.e., the cross-section of FIG. 2G is not representative of all cross sections of accelerometer 100) such that sacrificial layer 116 may be removed via a single opening, as described below.

In some implementations, sacrificial layer 116 is a carbon-based sacrificial layer that is deposited on portions of electrode layer 108, including the portion of electrode layer 108 that is covering cavity 104. In some implementations, sacrificial layer 116 may be removed at a later processing step in order to form a cavity that covers seismic mass 112, as described below. In some implementations, sacrificial layer 116 may have a thickness that ranges from approximately 50 nm to approximately 1.5 µm, or approximately 500 nm.

As further shown, oxide layer 114a may be formed on portions of electrode layer 108 where sacrificial layer 116 is not formed. In some implementations, oxide layer 114a may include a dielectric material, such as silicon oxide, that is deposited on the portions of electrode layer 108. In some implementations, oxide layer 114a may act as a structuring layer for supporting additional oxide layers, as described below. In some implementations, oxide layer 114a may have a thickness that ranges from approximately 100 nm to approximately 3 µm, or approximately 1 µm.

In some implementations, a process associated with flattening and/or smoothing a surface of sacrificial layer 116 and oxide layer 114a may be performed after formation of sacrificial layer 116 and oxide layer 114a (e.g., in order to remove any difference in thickness between sacrificial layer 116 and oxide layer 114a). For example, a chemical mechanical planarization (CMP) process may be performed in order to achieve a flat and smooth surface upon which additional layers may be formed. Notably, while the formation of sacrificial layer 116 and/or oxide layer 114a may not typically be part of a standard CMOS processing sequence, formation and of these layers may be integrated into such a sequence, as described herein.

Figure 2H:
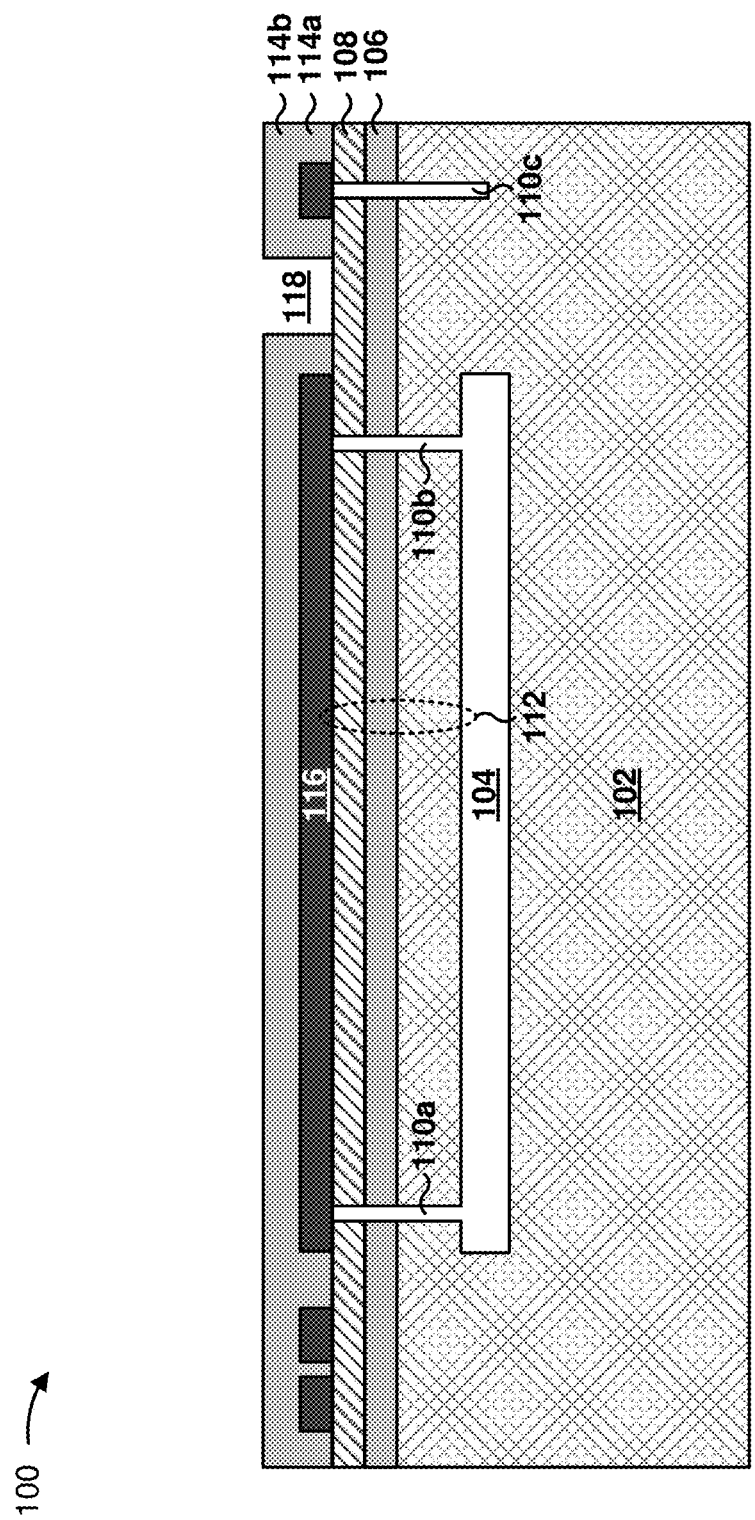

FIG. 2H is a diagram showing an example cross section associated with forming oxide layer 114b and opening 118. As shown, oxide layer 114b may be formed (e.g., deposited) on oxide layer 114a and sacrificial layer 116. In some implementations, oxide layer 114b may a same material as oxide layer 114a (e.g., a dielectric material, such as silicon oxide), and may be deposited on sacrificial layer 116 and oxide layer 114a. In some implementations, oxide layer 114b may define a top of a cavity over seismic mass 112 after sacrificial layer 116 is removed, as described below. In some implementations, oxide layer 114b may have a thickness that ranges from approximately 100 nm to approximately 3 µm, or approximately 600 nm.

As further shown, opening 118 may be formed (e.g., by etching) in oxide layer 114b and oxide layer 114a. As shown, opening 118 may extend through oxide layers 114a and 114b to electrode layer 108. As shown, opening 118 may be etched such that opening 118 is on a same side of trench 110c as seismic mass 112. In some implementations, opening 118 acts as a contact hole within which a contact layer may be formed in order to allow an electric potential to be applied to electrode layer 108, as described below. In some implementations, opening 118 may have a width that ranges from approximately 1 µm to approximately 10 µm, or approximately 5 µm.

In some implementations, formation of oxide layer 114b and opening 118 may be integrated with a CMOS processing sequence, since a typical CMOS processing sequence includes deposition and etching steps similar to those associated with FIG. 2H. In other words, steps associated with forming oxide layer 114b and opening 118 of accelerometer 100 may provide improved compatibility to a CMOS processing sequence (e.g., as compared to an accelerometer fabricated using a surface micromachining technique).

Figure 2I:
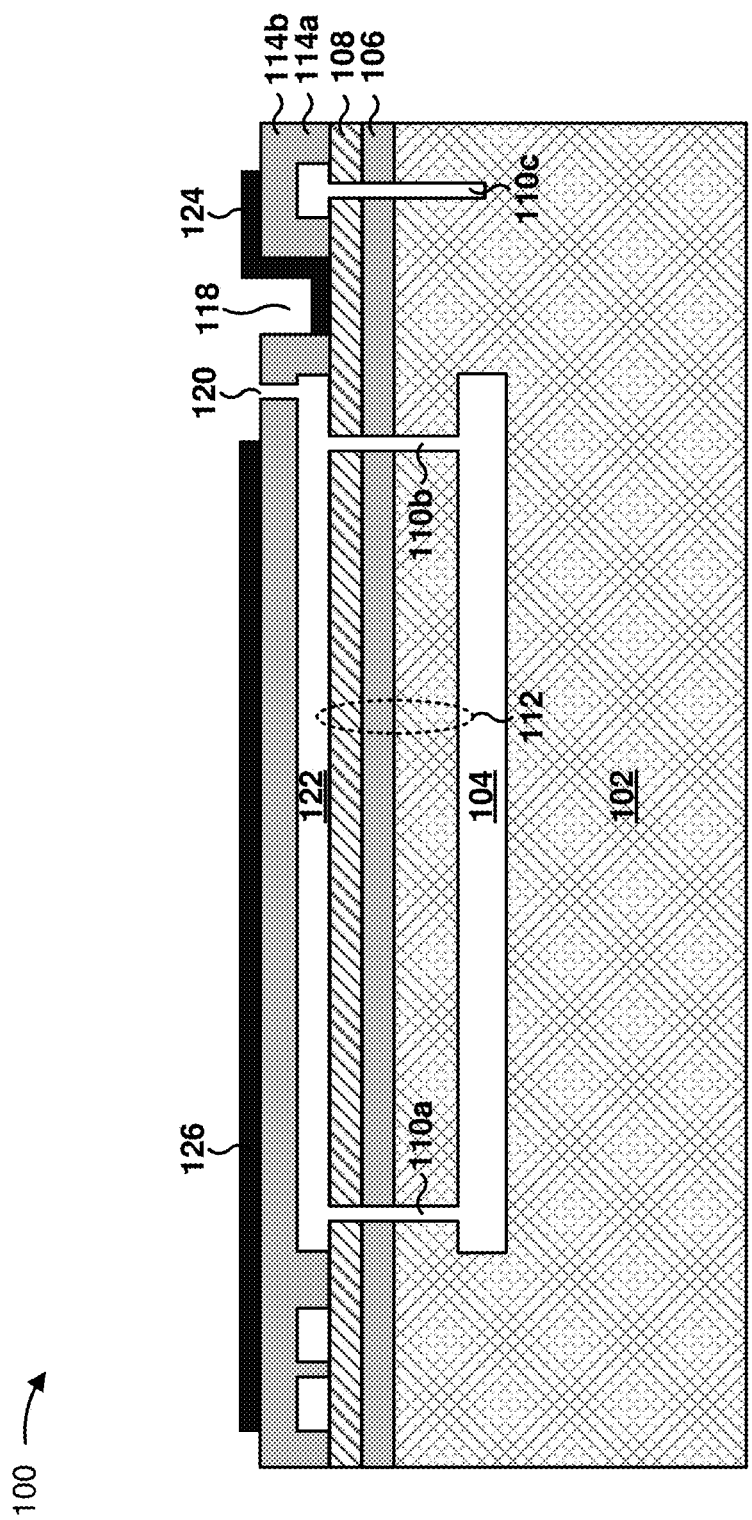

FIG. 2I is a diagram showing an example cross section associated with removing sacrificial layer 116, and forming contact layer 124 and electrode layer 126. As shown in FIG. 2I, opening 120 may be formed (e.g., by etching) in oxide layer 114b. In some implementations, as shown, opening 120 may be formed over seismic mass 112. As shown, opening 120 may extend through oxide layer 114a to sacrificial layer 116. In some implementations, opening 120 may have a width that ranges from approximately 100 nm to approximately 1 µm. In some implementations, after opening 120 is formed, sacrificial layer 116 may be removed by applying a removing process (i.e., a process that removes sacrificial layer 116) through opening 120. As shown, after removing sacrificial layer 116 through opening 120, cavity 122 is formed that covers seismic mass 112. As shown, cavity 122 is further bounded by oxide layers 114a and 114b. Notably, while the removal of sacrificial layer 116 may not typically be part of a standard CMOS processing sequence, removal of sacrificial layer 116 may be integrated into such a sequence, as described herein.

As further shown, contact layer 124 may be formed (e.g., deposited) on a portion of electrode layer 108 exposed by opening 118 (i.e., at a bottom of opening 118), a side of opening 118, and on a portion of oxide layer 114b (e.g., a portion of oxide layer 114a that is not over seismic mass 112). In some implementations, contact layer 124 is a metallic layer or another type of conductive layer via which an electric potential may be applied to the portion of electrode layer 108 included in seismic mass 112 for implementation of the capacitive sensing scheme. In some implementations, contact layer 124 may have a thickness that ranges from approximately 600 nm to approximately 2.8 µm, or approximately 600 nm.

As further shown in FIG. 2I, electrode layer 126 may be formed (e.g., deposited) on a portion of oxide layer 114b. As shown, electrode layer 126 may be formed such that electrode layer 126 is separated from (e.g., above in FIG. 2I) the portion of electrode layer 108 included in seismic mass 112. In some implementations, electrode layer 126 is a metallic layer or another type of conductive layer (e.g., formed from a same material as contact layer 124) via which an electric potential may be applied to as part of implementing a capacitive sensing technique based on which accelerometer 100 operates. In some implementations, electrode layer 126 may have a thickness that ranges from approximately 600 nm to approximately 2.8 µm, or approximately 600 nm.

In some implementations, formation of contact layer 124 and electrode layer 126 may be integrated with a CMOS processing sequence, since a typical CMOS processing sequence includes formation of metallic layers similar to those associated with forming contact layer 124 and electrode layer 126. In other words, steps associated with forming contact layer 124 and electrode layer 126 of accelerometer 100 may provide improved compatibility to a CMOS processing sequence (e.g., as compared to an accelerometer fabricated using a surface micromachining technique).

Figure 2J:
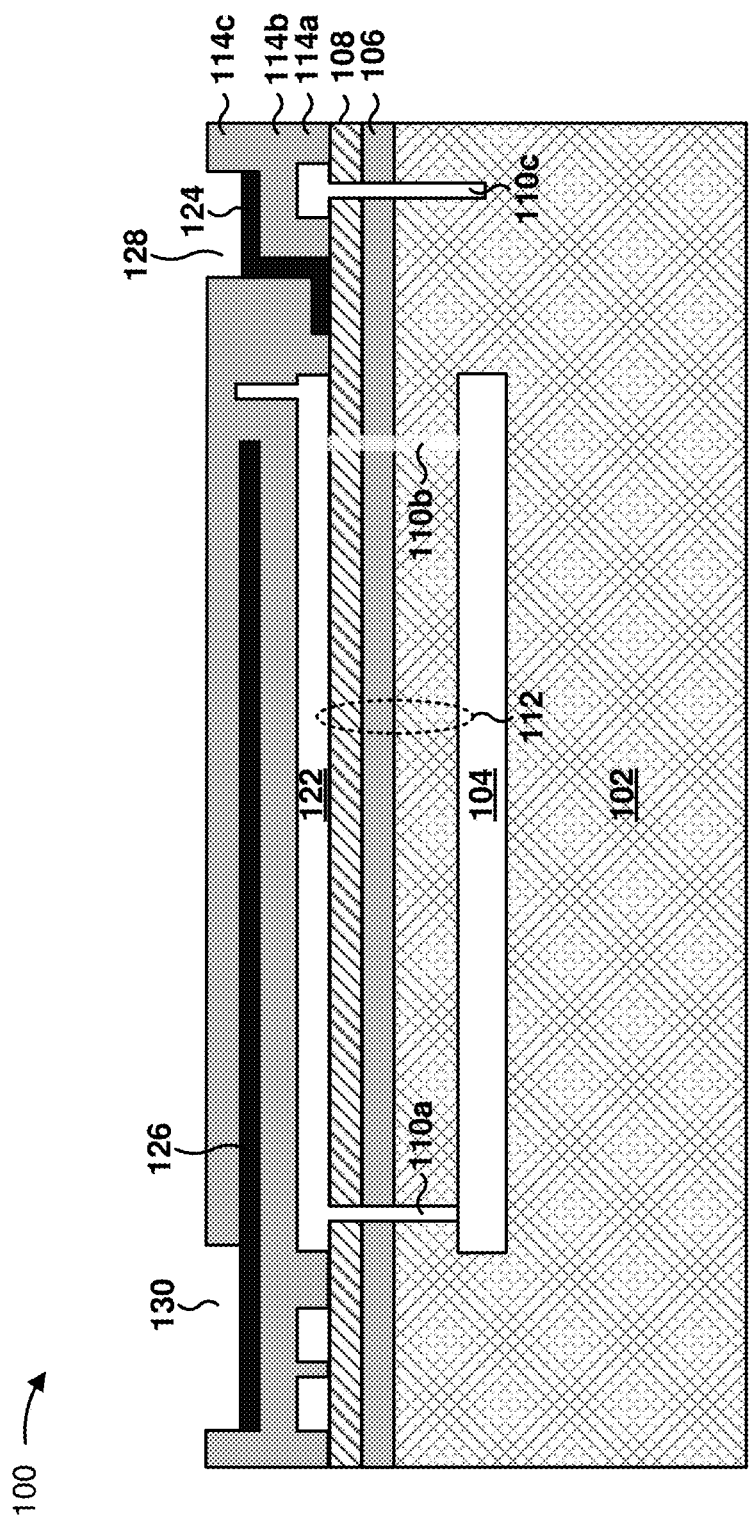

FIG. 2J is a diagram showing an example cross section associated with forming oxide layer 114c and openings 128 and 130. In some implementations, oxide layer 114c may be formed (e.g., deposited) on exposed portions of oxide layer 114b, contact layer 124, and electrode layer 126. In some implementations, oxide layer 114c may be formed such that oxide layer 114c fills opening 118 and covers opening 120. In some implementations, oxide layer 114c may be formed such that a top surface of oxide layer 114c is relatively flat across accelerometer 100. In some implementations, oxide layer 114c may be a same material as oxide layers 114a and/or 114b (e.g., a dielectric material, such as silicon oxide). In some implementations, oxide layer 114b may act to isolate a portion of electrode layer 126 and/or contact layer 124. In some implementations, oxide layer 114c may have a thickness on electrode layer 126 that ranges from approximately 100 nm to approximately 5 µm, such as approximately 300 nm.

As further shown, opening 128 may be formed (e.g., by etching) in oxide layer 114c over an upper portion of contact layer 124. As shown, opening 128 may extend through oxide layer 114c to the upper portion of contact layer 124. As shown, opening 128 may be etched such that opening 128 exposes the upper portion of contact layer 124. In some implementations, opening 128 acts as a contact hole via which an electric potential may be applied to electrode layer 108 via contact layer 124. In some implementations, opening 128 may have a width that ranges from approximately 60 µm to approximately 300 µm, or approximately 120 µm.

As further shown, opening 130 may be formed (e.g., by etching) in oxide layer 114c over a portion of electrode layer 126. As shown, opening 130 may extend through oxide layer 114c to electrode layer 126. As shown, opening 130 may be etched such that opening 130 exposes the portion of electrode layer 126. In some implementations, opening 130 acts as a contact hole via which an electric potential may be applied to electrode layer 126. In some implementations, opening 130 may have a width that ranges from approximately 60 µm to approximately 300 µm, or approximately 120 µm.

In some implementations, formation of oxide layer 114c and openings 128 and 130 may be integrated with a CMOS processing sequence, since a typical CMOS processing sequence includes deposition and etching steps similar to those associated with FIG. 2J. In other words, steps associated with forming oxide layer 114c and openings 128 and 130 of accelerometer 100 may provide improved compatibility to a CMOS processing sequence (e.g., as compared to an accelerometer fabricated using a surface micromachining technique).

The number, arrangement, widths, thicknesses, order, symmetry, or the like, of layers shown in FIGS. 2A-2J are provided as an example. In practice, accelerometer 100 may include additional layers, fewer layers, different layers, differently constructed layers, differently arranged layers, layers composed of different materials, or layers of different widths and/or thicknesses than those shown in FIGS. 2A-2J. Additionally, or alternatively, a set of layers (e.g., one or more one or more layers) of accelerometer 100 may perform one or more functions described as being performed by another set of layers of accelerometer 100.

Additionally, or alternatively, the order of processing steps associated with forming accelerometer 100 may include additional steps, fewer steps, different steps, or differently ordered steps than those described in connection with FIGS. 2A-2J.

Figure 3:
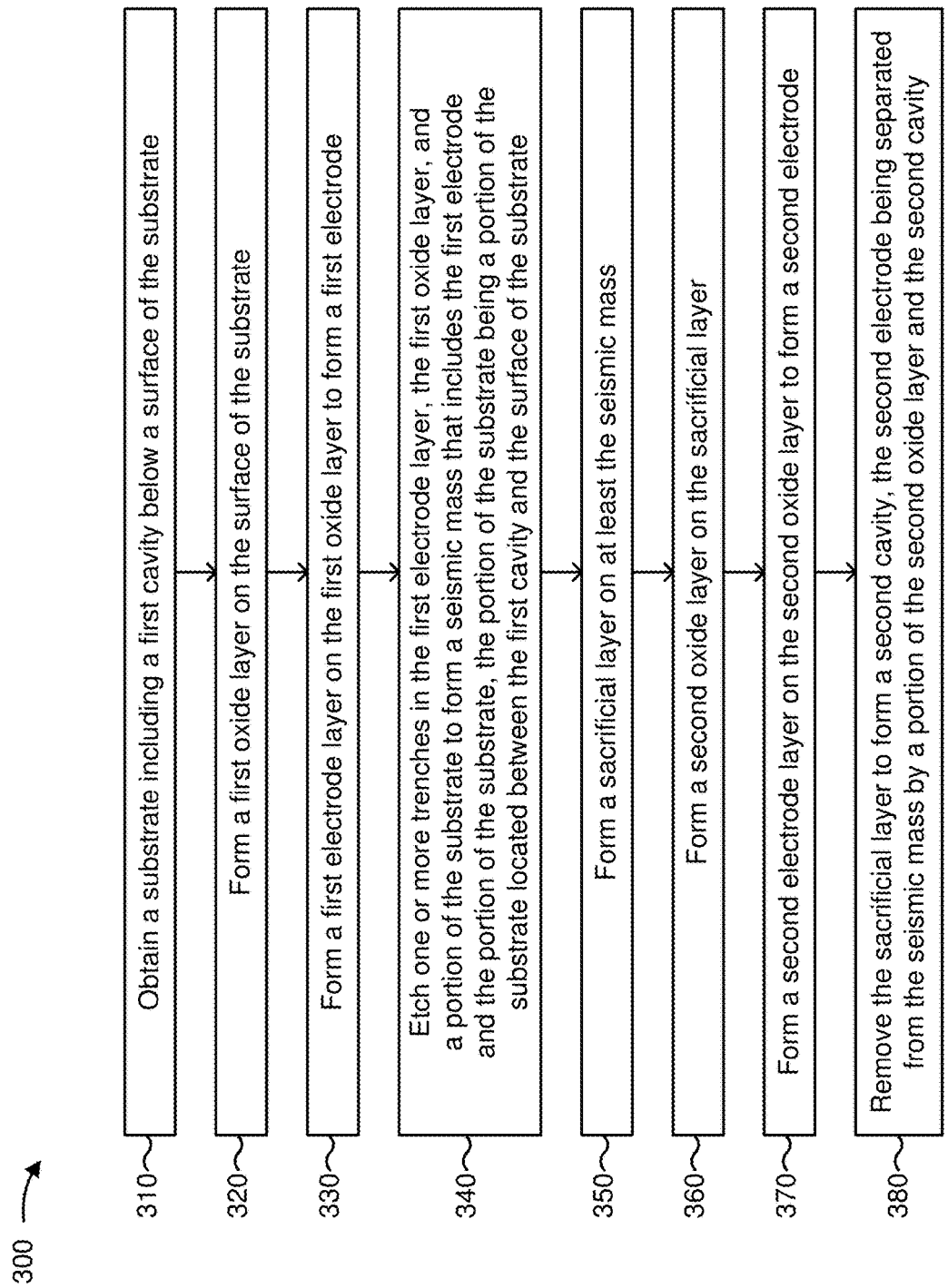
FIG. 3 is a diagram of an example process for forming the example accelerometer of FIG. 1.

FIG. 3 is a flow chart of an example process 300 for forming accelerometer 100 in accordance with the process steps described in FIGS. 2A-2J.

As shown in FIG. 3, process 300 may include obtaining a substrate including a first cavity below a surface of the substrate (block 310). For example, substrate 102, which includes cavity 104 below a surface (e.g., a top surface) of substrate 102, may be obtained, as described above with regard to FIG. 2A.

As further shown in FIG. 3, process 300 may include forming a first oxide layer on the surface of the substrate (block 320). For example, oxide layer 106 may be formed on the surface of substrate 102, as described above with regard to FIG. 2B.

As further shown in FIG. 3, process 300 may include forming a first electrode layer on the first oxide layer to form a first electrode (block 330). For example, electrode layer 108 may be formed on oxide layer 106 to form a first electrode, as described above with regard to FIG. 2B.

As further shown in FIG. 3, process 300 may include etching one or more trenches in the first oxide layer, the first electrode layer, and a portion of the substrate to form a seismic mass that includes the first electrode and the portion of the substrate, the portion of the substrate being a portion of the substrate located between the first cavity and the surface of the substrate (block 340). For example, trenches 110 may be etched in electrode layer 108, oxide layer 106, and the portion of substrate 102 located between the surface of substrate 102 and cavity 104 in order to form seismic mass 112, as described above with regard to FIGS. 2C-2F.

As further shown in FIG. 3, process 300 may include forming a sacrificial layer on at least the seismic mass (block 350). For example, sacrificial layer 116 may be formed on at least seismic mass 112, as described above with regard to FIG. 2G.

As further shown in FIG. 3, process 300 may include forming a second oxide layer on the sacrificial layer (block 360). For example, oxide layer 114b may be formed on sacrificial layer 116, as described above with regard to FIG. 2H.

As further shown in FIG. 3, process 300 may include forming a second electrode layer on the second oxide layer to form a second electrode (block 370). For example, electrode layer 126 may be formed on oxide layer 114b to form a second electrode, as described above with regard to FIG. 2I.

As further shown in FIG. 3, process 300 may include removing the sacrificial layer to form a second cavity, the second electrode being separated from the seismic mass by a portion of the second oxide layer and the second cavity (block 380). For example, sacrificial layer 116 may be removed to form cavity 122, where electrode layer 126 is separated by seismic mass 112 by a portion of oxide layer 114b and cavity 122, as described above with regard to FIG. 2J.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An accelerometer, comprising:
a seismic mass to flex based on acceleration components perpendicular to a surface of a substrate,
the seismic mass including a first electrode, an oxide layer, and a portion of the substrate,
a first surface of the seismic mass being adjacent to a first cavity in the substrate, and
a second surface of the seismic mass being adjacent to a second cavity,
the first surface of the seismic mass and the second surface of the seismic mass being on opposite sides of the seismic mass; and
a second electrode separated from the second surface of the seismic mass by at least the second cavity.

2. The accelerometer of claim 1, wherein the portion of the substrate included in the seismic mass includes migrated substrate particles.

3. The accelerometer of claim 1, wherein the first cavity is formed using a silicon-on-nothing process.

4. The accelerometer of claim 1, wherein the second cavity is formed by removing a sacrificial layer deposited on at least the seismic mass.

5. The accelerometer of claim 1, further comprising a set of oxide layers that define the second cavity.

6. The accelerometer of claim 1, wherein the first electrode includes a portion of an electrode layer that is formed on the second surface of the seismic mass,
the electrode layer being separated from the surface of the substrate by the oxide layer.

7. The accelerometer of claim 1, wherein the first electrode is formed by diffusing a counter-doping species into the portion of the substrate included in the seismic mass.

8. A semiconductor device, comprising:
a substrate including a first cavity;
a seismic mass formed of a portion of the substrate and a first electrode,
a first surface of the seismic mass being adjacent to the first cavity, and
a second surface of the seismic mass being adjacent to a second cavity,
the first electrode being located at the second surface of the seismic mass, and
the first surface of the seismic mass and the second surface of the seismic mass being on opposite sides of the seismic mass;
an oxide layer that defines the second cavity; and
a second electrode separated from the second surface of the seismic mass by a portion of the oxide layer and the second cavity.

9. The semiconductor device of claim 8, wherein the first cavity is formed using a silicon-on-nothing (SON) process.

10. The semiconductor device of claim 9, wherein the portion of the substrate included in the seismic mass includes particles having migrated as a result of the SON process.

11. The semiconductor device of claim 8, wherein the second cavity is formed by removing a sacrificial layer from between the second surface of the seismic mass and the oxide layer.

12. The semiconductor device of claim 11, wherein the sacrificial layer is a carbon sacrificial layer.

13. The semiconductor device of claim 8, wherein the first electrode comprises an electrode layer formed on an other oxide layer,
the other oxide layer being formed on the second surface of the seismic mass.

14. The semiconductor device of claim 13, wherein the electrode layer is formed from a polycrystalline material.

15. The semiconductor device of claim 8, wherein the first electrode is formed by diffusing a counter-doping species into the portion of the substrate included in the seismic mass.

16. The semiconductor device of claim 8, wherein the second electrode comprises a metallic layer.

17. The semiconductor device of claim 8, wherein another portion of the oxide layer is formed on a portion of the second electrode.

18. The semiconductor device of claim 8, wherein manufacturing of the semiconductor device is integrated with a complementary metal-oxide-semiconductor (CMOS) processing sequence.

19. A method for manufacturing a semiconductor device, the method comprising:
obtaining a substrate including a first cavity below a surface of the substrate;
forming a first oxide layer on the surface of the substrate;
forming a first electrode layer on the first oxide layer to form a first electrode;
etching one or more trenches in the first electrode layer, the first oxide layer, and a portion of the substrate to form a seismic mass that includes the first electrode, a portion of the first oxide layer, and the portion of the substrate,
the portion of the substrate being located between the first cavity and the surface of the substrate;
forming a sacrificial layer on at least the seismic mass;
forming a second oxide layer on the sacrificial layer;
forming a second electrode layer on the second oxide layer to form a second electrode; and
removing the sacrificial layer to form a second cavity,
the second electrode being separated from the seismic mass by a portion of the second oxide layer and the second cavity.

20. The method of claim 19, wherein the portion of the substrate included in the seismic mass includes substrate particles having migrated as a result of a silicon-on-nothing (SON) process.

* * * * *